United States Patent

Moulin et al.

[11] 3,903,931
[45] Sept. 9, 1975

[54] SLEEVE HAVING DEFORMABLE WALLS

[75] Inventors: Maurice Moulin, Palaisfau; Michel Rozé, Saint-Cyr-L'Ecole; Jean Vivien, Les Clayes Sous Bois, all of France

[73] Assignee: Commissariat a l'Energie Atomique, Paris, France

[22] Filed: June 25, 1973

[21] Appl. No.: 372,930

[30] Foreign Application Priority Data
July 3, 1972 France .......................... 72.24000

[52] U.S. Cl. .............. 138/148; 138/117; 165/46; 220/3
[51] Int. Cl. .............. F16l 9/02; F16l 9/22
[58] Field of Search .......... 138/148, 149, 151, 140, 138/DIG. 5, 117; 165/46; 29/471.1; 220/3

[56] References Cited
UNITED STATES PATENTS

| 409,265 | 8/1889 | Wyckoff et al. ............... 138/149 |
|---|---|---|
| 601,542 | 3/1898 | Barnes .......................... 138/148 X |
| 2,259,433 | 10/1941 | Kitto ............................ 138/148 X |
| 2,625,804 | 1/1953 | Patch et al. ................... 165/46 X |
| 2,959,196 | 11/1960 | Truesdell et al. ................ 138/148 |
| 2,980,568 | 4/1961 | Kazmierowicz ............... 138/149 X |
| 3,463,161 | 8/1969 | Andrassy ....................... 165/46 X |
| 3,793,145 | 2/1974 | Jordan et al. ................... 220/3 |

Primary Examiner—Richard C. Queisser
Assistant Examiner—Daniel M. Yasich
Attorney, Agent, or Firm—Cameron, Kerkam, Sutton, Stowell & Stowell

[57] ABSTRACT

A hollow-walled deformable sleeve for heat insulation and application of prestress to a cylindrical component within an enclosure is constituted by two coaxial walls joined to each other by two half-tori each having the same axis as the walls. Flutes formed in uniformly spaced relation around the periphery of each wall have terminal openings alternately on one half-torus and on the other. Each flute has an axis which is parallel to that of the sleeve and a length which exceeds one-half the height of said sleeve.

4 Claims, 5 Drawing Figures

SLEEVE HAVING DEFORMABLE WALLS

This invention relates to a hollow-walled sleeve and to a method of fabrication of said sleeve.

There are many known instances in which it is found necessary to apply a prestress to a cylindrical part placed within a cavity which is also cylindrical while at the same time ensuring transverse and longitudinal leak-tightness between said part and the cavity wall. This is the case in particular with the heat-insulation of ducts employed in nuclear reactors as disclosed, for example, in U.S. patent application Ser. No. 286,428 filed Sept. 5, 1972 now allowed as U.S. Pat. No. 3,847,148.

One design solution consists precisely in making use of a hollow-walled deformable sleeve to act as a spacer to support insulation into which a fluid is injected in order to produce deformation of the walls of said sleeve into contact with a duct and consequently in order to apply a prestress on the inner duct by using the internal walls of the outer duct as supporting means while ensuring leak-tightness between the two ducts.

In this case, the outer face of said sleeve must be capable of elongation within the elastic range in order to take-up the play due to allowance in assembly and the inner face must contract. If the play between the inner face and the part to be stressed is excessive, wrinkles are formed in the wall of the sleeve. These wrinkles are liable to create leakage paths for the gas which is conveyed within the duct if this latter is not leak-tight. In order to circumvent this disadvantage, it is necessary to ensure that the walls of the sleeve work within the elastic range and thus to prevent these deformations.

The precise aim of the present invention is to provide a sleeve having a deformable wall and a method of fabrication of said sleeve which overcome the disadvantages mentioned in the foregoing, especially by ensuring that the metal which constitutes the sleeve works within the elastic range.

The hollow-walled deformable sleeve essentially has the shape of a hollow ring of revolution constituted by two coaxial walls, namely an inner wall and outer wall which are joined to each other by two half-tori having the same axis as said walls, flutes being formed in each wall aforesaid and uniformly spaced over the periphery of said wall, the axis of each flute being parallel to that of said sleeve and the length of each flute being slightly greater than one-half the height of said sleeve, said flutes being such as to have their openings alternately on one half-torus or on the other.

In accordance with a first alternative embodiment, said sleeve is of cylindrical shape. In a second alternative embodiment, the sleeve is of frusto-conical shape. In a third alternative embodiment, said sleeve has the shape of a frustum of sphere.

It is therefore apparent that the desired result is obtained by forming corrugations or flutes on each wall of the sleeve. The deformations of the sleeve are in fact absorbed by the folding or unfolding of said flutes. In order to obtain leak-tightness by means of the sleeve, the flutes which open onto each of the two half-tori extend over only a little more than one-half the height of said sleeve.

The method of fabrication of the deformable sleeve essentially consists in making provision for a fluted inner wall constituted by a cylindrical sheet element having outwardly folded edges so as to form two quarter-tori and for an outer wall constituted by a cylindrical fluted sheet element, and for two quarter-tori of sheet material, and in welding said quarter-tori to the inner wall and to the outer wall in order to form the sleeve.

A clearer understanding of the invention will in any case be gained from the following description of one embodiment of the invention which is given by way of example but without any limitation being implied, and in which.

Figures 1, 4:
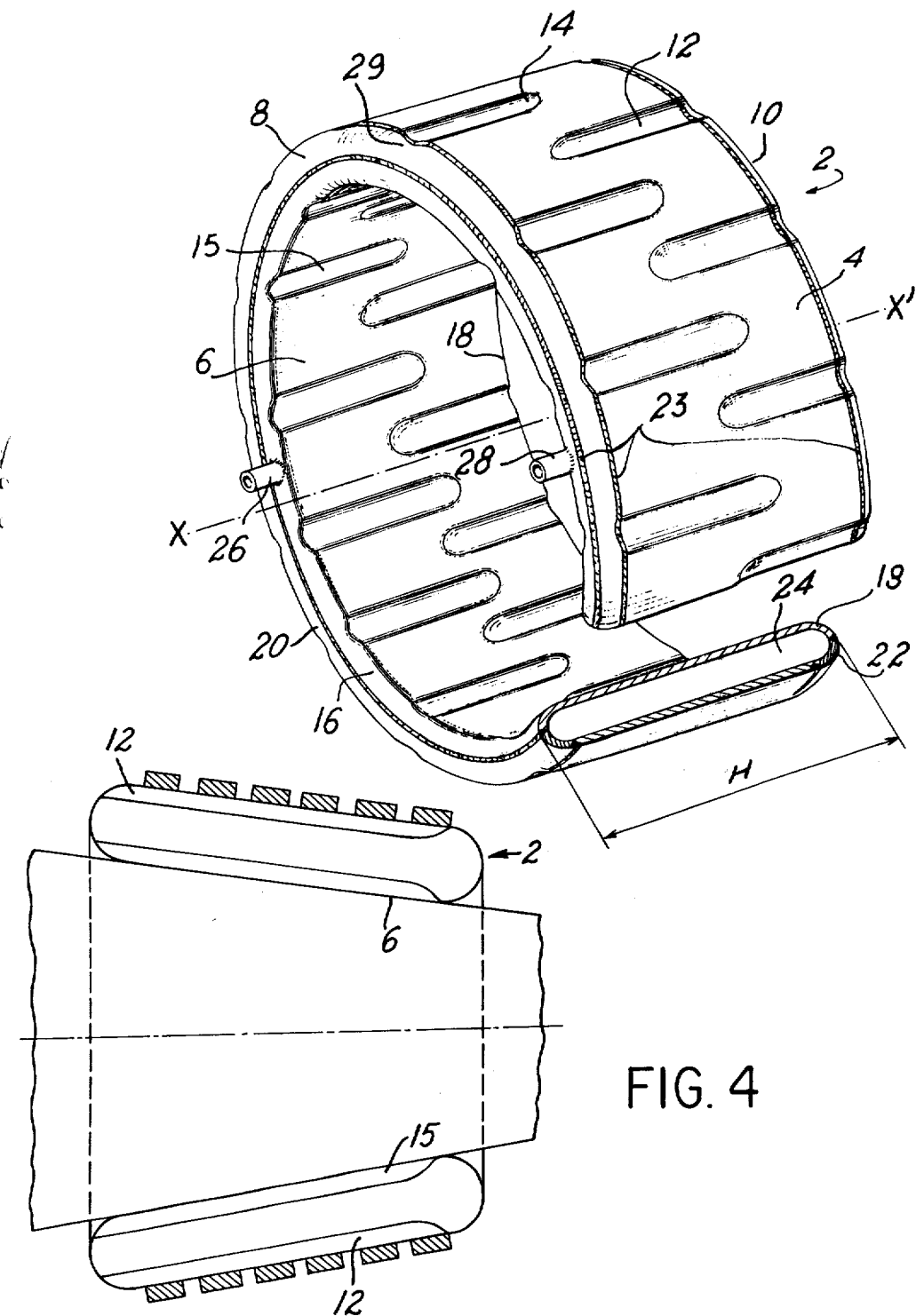
FIG. 1 is a general view in perspective showing the sleeve in accordance with the invention.
FIG. 4 shows the sleeve in frusto-conical shape.
Figure 2:
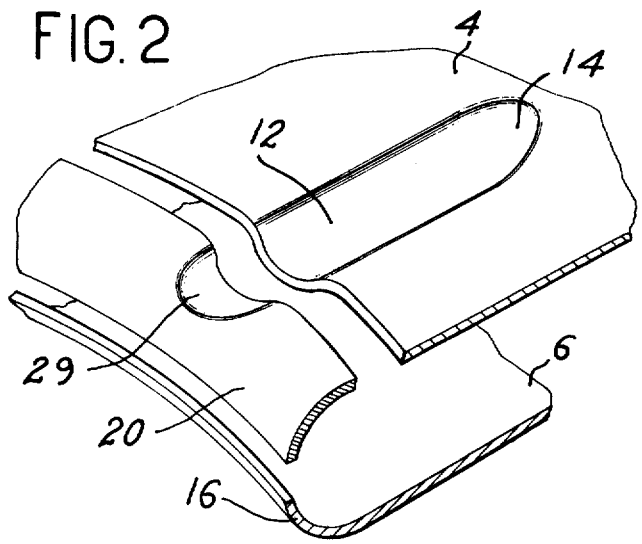
FIG. 2 is a detail view of part of the sleeve and showing the mode of assembly of the walls of said sleeve.
Figure 5:
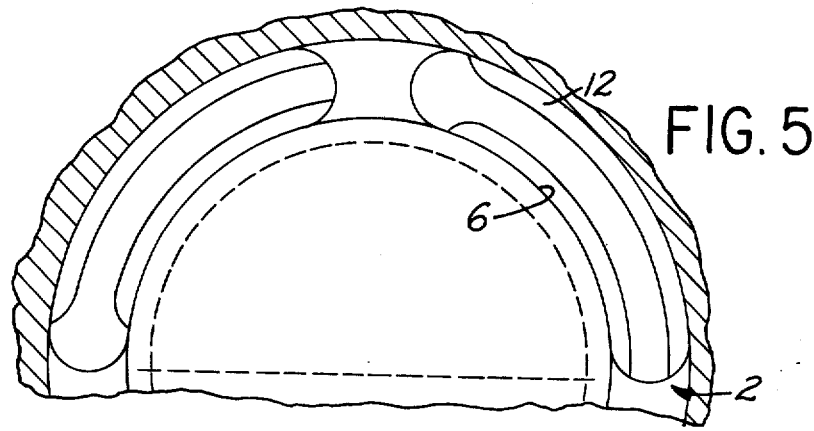
FIG. 5 shows the sleeve in the shape of a frustum of a sphere.

In FIG. 1, the sleeve 2 which forms the subject of the invention has the general shape of a hollow cylindrical ring limited by an outer wall 4, an inner wall 6 and two half-tori 8 and 10. The outer wall 4 is constituted by a cylindrical shell having an axis X—X' and formed of sheet material. Corrugations or flutes such as the flutes 12, shown in FIGS. 1, 4 and 5, are provided in the wall of said shell by deformation and each have the shape of a re-entrant semi-cylinder having an axis parallel to the axis X—X' of the sleeve. One end of each flute opens onto the semi-toric portion 8 or 10 and the other end terminates in a rounded portion 14. The length of each flute is slightly greater than one-half the height H of the sleeve. Said flutes have their openings alternately on either the half-torus 8 or the half-torus 10.

The inner wall 6 also has the shape of a cylindrical shell provided with flutes such as 15 which are identical with the flutes 12 of the outer wall both in shape and relative spacing. The inner wall 6 terminates in an external rounded portion designated by the references 16 and 18 respectively and each rounded portion thus constitutes a quarter-torus.

The sleeve is closed by means of two external quarter-tori designated by the references 20 and 22 respectively, each quarter-torus being welded on the one hand to the outer wall 4 and on the other hand to the edges of the quarter-tori 16 and 18 (the weld fillets are designated in FIG. 1 by the reference 23). A leak-tight sleeve is thus obtained. The cavity 24 of the sleeve which is shown in partial cross-section thus has the general shape of a rectangle terminating in two rounded profiles which correspond in shape to the half-tori 8 and 10.

It is apparent that the sleeve is additionally provided with two nozzles such as the nozzles designated by the references 26 and 28 which are welded, for example, to the half-tori 8 or 10 so as to selectively permit the admission of fluid under pressure.

The sleeve can clearly be provided with more than two inlets in order to facilitate the admission of gas under pressure and discharge of air.

It is therefore noted that, as a result of folding or unfolding of the fluted portions 12, the metal always works within the elastic range over the full height H of the sleeve inasmuch as the flutes interpenetrate each other. Moreover, since the flutes do not extend over the entire height H of the sleeve 2, leak-tightness is ensured between on the one hand the outer duct and the sleeve 2 and, on the other hand, between the inner duct to be prestressed and said sleeve 2.

In a preferred mode of a fabrication of the invention, the deformable sleeve 2 is formed of four elements, namely an outer face 4, an inner face 6 and two pairs of tori 20 and 22. These different elements are subsequently welded or bonded together in order to produce the sleeve in accordance with the invention.

The inner face 6 is constituted by a rectangular sheet element, the developed length of which corresponds to the circumference of the mean diameter of the sleeve. The flutes 15 are then formed at their intended locations by roller bending and the ends of the rectangular sheet element are joined together by welding, the diameter obtained on the inside of the inner face 6 being the internal diameter of the sleeve 2.

The edges of the sheet element are then formed so as to obtain the inner quarter-tori 16 and 18. To this end, the sheet element is maintained in a suitable shape and the edge of the sheet element is foled outwards, the difference in circumferential length being compensated by the unfolding of the fluted portions which were previously formed. The border thus obtained has neither any corrugations nor any variation in thickness of the sheet element at the mean diameter of the sleeve.

The outer quarter-tori 20 and 22 are obtained from a flat circular blank of sheet material having the same thickness as the inner and outer walls, said blank being placed and maintained in a suitable die, then turned back by bending. The excess in circumferential length of the external diameter forms flutes such as 29 corresponding to those which are necessary on the outer face 4 of the sleeve.

The internal diameter of the flat starting blank is the mean diameter of the sleeve, the external diameter being equal to the mean diameter increased by twice the developed width of the quarter-torus.

There is therefore obtained a quarter-torus having an internal diameter constituting a border which is not provided with any corrugation in the thickness of the sheet material at the mean diameter of the sleeve and is ready to be welded or bonded to the external border of the inner sheet element 6. The external diameter obtained after bending is the external diameter of the sleeve.

The outer face 4 is formed by a rectangular sheet element having a length equal to the circumferential length of the mean diameter increased by twice the developed width of the outer quarter-torus. After forming of the flutes such as 12 by roller bending, the two ends of the sheet element 4 are joined together by welding or bonding. The outer face of the sleeve is thus obtained, the external diameter of the sheet element being that of the sleeve.

It is then only necessary to weld the components to each other in order to obtain the hollow-walled sleeve. Since the initial thickness of the metal is maintained at the time of deformations of the sleeve, a smaller thickness can be given to the sheet elements which constitute said sleeve.

It should be understood that the term "sheet elements" is used in this description in the broadest sense in that it applies not only to sheet steel but also to sheet material formed of aluminum, of metal alloys or of unalloyed copper. Even plastics such as nylon or teflon can be employed in some applications.

Figure 3:
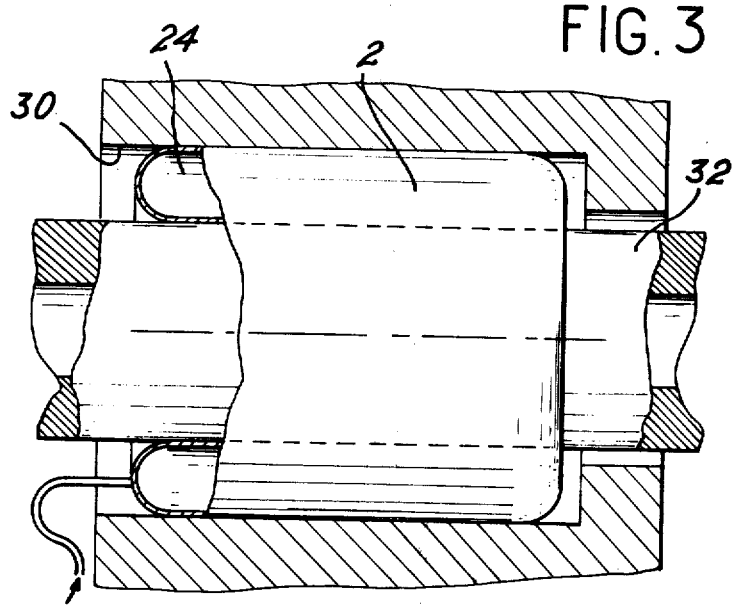
FIG. 3 is a vertical sectional view of one example of utilization of said sleeve.

In FIG. 3, there is shown one example of application of a sleeve according to the invention to the heat-insulation of a duct 30. The heat-insulating material 32 is surrounded by a series of sleeves 2 (only one of which is shown), said sleeves being placed between the duct 30 and the heat-insulating material 32. By injecting a fluid under pressure, the sleeve 2 makes it possible to apply a prestress to the heat insulation 32 while ensuring longitudinal leak-tightness of the installation.

The hollow-walled deformable sleeves in accordance with this invention can clearly be employed for applications other than the heat-insulation of enclosures. In particular, said sleeves can be applied to the prestressing of cylindrical concrete pressure vessels or slabs by interposing an annular sleeve between the concrete and a peripheral restraint or external hoop constituted by a metallic strip wound in one or a number of thicknesses either in a simple or crossed helix without initial tension. In this cade, a uniform prestress is applied at the time of pressurization of the annular sleeve.

What we claim is:

1. A hollow sleeve surrounding a duct having the shape of a hollow ring of revolution, two spaced deformable coaxial walls for said sleeve, said walls being an inner and outer wall, two curved wall extensions having the same axis as said walls welded to and connecting and sealing said walls, preformed resilient corrugations in each of said walls uniformly spaced ove the periphery of each of said walls, the axis of each of said corrugations being parallel to that of said sleeve and the length of each of said corrugations being slightly greater than one-half the height of said sleeve, said corrugations opening alternately on opposite ones of said curved extensions and means for applying pressure within said sleeve to expand said sleeve into contact with the duct.

2. A hollow deformable sleeve according to claim 1, wherein said hollow sleeve is of cylindrical shape.

3. A hollow deformable sleeve according to claim 1, wherein said sleeve is of frusto-conical shape.

4. A hollow deformable sleeve according to claim 1, wherein said sleeve has the shape of a frustum of sphere.

* * * * *